United States Patent [19]

Takashima et al.

[11] Patent Number: 5,701,343
[45] Date of Patent: Dec. 23, 1997

[54] METHOD AND SYSTEM FOR DIGITAL INFORMATION PROTECTION

[75] Inventors: Youichi Takashima; Shinji Ishii; Kiyoshi Yamanaka, all of Kanagawaken, Japan

[73] Assignee: Nippon Telegraph & Telephone Corporation, Tokyo, Japan

[21] Appl. No.: 564,925

[22] Filed: Nov. 29, 1995

[30] Foreign Application Priority Data

Dec. 1, 1994 [JP] Japan ............... P6-298702
Dec. 2, 1994 [JP] Japan ............... P6-299940

[51] Int. Cl.$^6$ ............................................. H04L 9/00
[52] U.S. Cl. ............................ 380/4; 380/21; 380/24
[58] Field of Search ............................ 380/4, 21, 23, 380/24, 25

[56] References Cited

U.S. PATENT DOCUMENTS

| | | |
|---|---|---|
| 4,405,829 | 9/1983 | Rivest et al. . |
| 4,408,119 | 10/1983 | Decavele . |
| 5,218,637 | 6/1993 | Angebaud et al. ............ 380/23 |
| 5,224,166 | 6/1993 | Hartman . |
| 5,228,084 | 7/1993 | Johnson et al. ............ 380/23 |
| 5,345,506 | 9/1994 | Tsubakiyama et al. ............ 380/23 |
| 5,377,267 | 12/1994 | Suzuki et al. ............ 380/23 |
| 5,396,558 | 3/1995 | Ishiguro et al. ............ 380/25 |
| 5,455,953 | 10/1995 | Russell ............ 380/4 |
| 5,475,756 | 12/1995 | Merritt ............ 380/24 |
| 5,475,758 | 12/1995 | Kikuchi ............ 380/25 |
| 5,483,596 | 1/1996 | Rosenow et al. ............ 380/25 |
| 5,502,765 | 3/1996 | Ishiguro et al. ............ 380/24 |
| 5,515,439 | 5/1996 | Bantz et al. ............ 380/23 |
| 5,534,857 | 7/1996 | Laing et al. ............ 380/21 |
| 5,602,918 | 2/1997 | Chen et al. ............ 380/21 |

FOREIGN PATENT DOCUMENTS 2 697 929 11/1992 France .
PCT/AU93/00137 3/1993 WIPO .
PCT/AU92/00608 5/1993 WIPO .

OTHER PUBLICATIONS

1988 International Zurich Seminar On Digital Communications, Mapping New Applications Onto New Technologies; Mar. 8–10, 1988, ETH Zurich/Switzerland.
Article entitled, Superdistribution: The Concept and the Architecture, by Mori and Kawahara, dated Jul., 1990, pp. 1133–1146.
Abstract from *Siemens AG*, entitled "Response to DAVIC's Second Call for Proposals (CFP2_003)", dated May 4–9, 1995.
Paper from The Transactions of the Institute of Electronics, Information and Communication Engineers, "Superdistribution: The concept and the Architecture", by Mori and Kawahara, dated Jul. 1990, vol. E73, No. 7.
Abstract entitled "A Method for Obtaining Digital Signature and Public–Key Cryptosystems", by Rivest, et al., vol. 21 of the ACM, dated Feb. 1978.

*Primary Examiner*—David C. Cain
*Attorney, Agent, or Firm*—Banner & Witcoff, Ltd.

[57] ABSTRACT

A digital information protection scheme using an improved security protocol. In a system in which a user makes an access to a digital information provided by an information center by connecting a computer card owned by the user to an information terminal device connected with the information center, a work key for encrypting a desired digital information is delivered from the information center to the computer card through the information terminal device, and the work key is registered in the computer card; the desired digital information encrypted by the work key is delivered from the information center to the information terminal device; and an encrypted digital information delivered from the information center is decrypted at the information terminal device by using the work key registered in the computer card, and a decrypted digital information is provided to the user at the information terminal device.

35 Claims, 16 Drawing Sheets

$Y_i = S^{(r_i + e_i)} \mod n'$
WHERE $ID_U = S^2 \mod n'$
$EE = (e_0 | e_1 | \cdots | e_{63})$
$WK = EE \| h(XX, RQS)$
WK REGISTERED $EE = WK \| h(XX, RQS)$
$(e_0 | e_1 | \cdots | e_{63}) = EE$
$Y_i^2 \stackrel{?}{\equiv} ID_U^{e_i} \cdot X_i \pmod{n'}$
$R_U, S_U, e_i, Y_i$
USED AS GROUND FOR CHARGING $V = E_{KPS} (WK, r)$ ReqW : WK REQUEST MESSAGE
(CONTAINING RANDOM NUMBER r)

FIG.16
(1) INFORMATION REQUEST & USER AUTHENTICATION
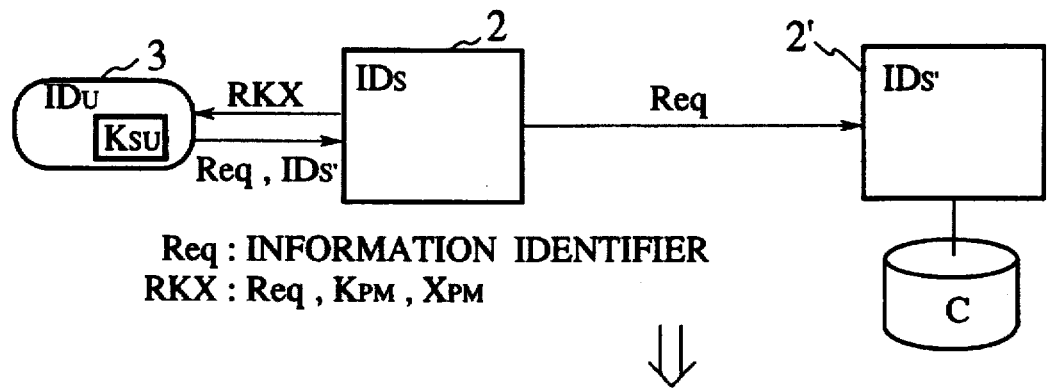
Req : INFORMATION IDENTIFIER
RKX : Req , $K_{PM}$ , $X_{PM}$
(2) INFORMATION DELIVERY & STORAGE
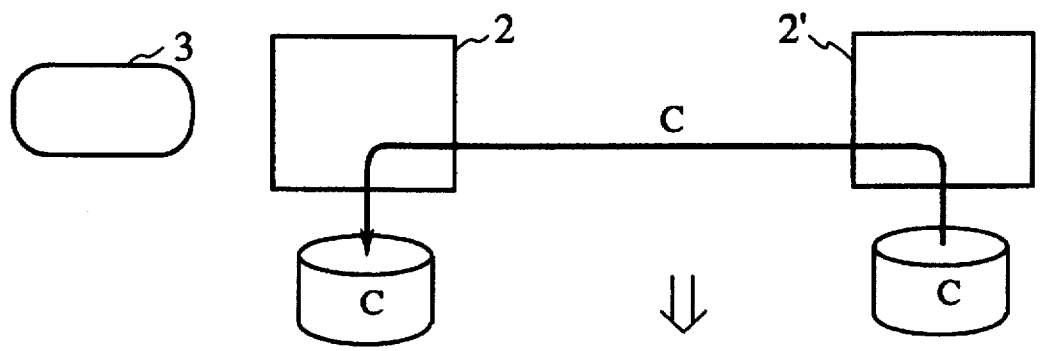
(2') INFORMATION DELIVERY
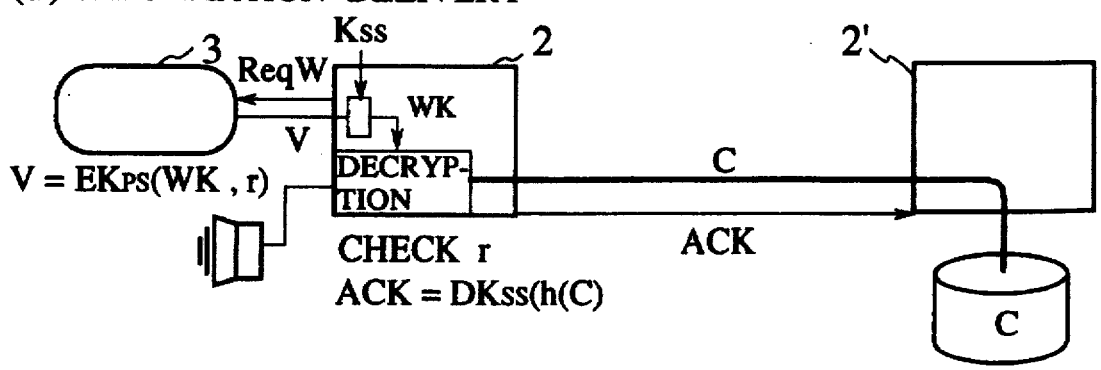
$V = EK_{PS}(WK , r)$
CHECK r
$ACK = DK_{SS}(h(C))$

METHOD AND SYSTEM FOR DIGITAL INFORMATION PROTECTION

BACKGROUND OF THE INVENTION

1. Field of the Invention

The present invention relates to a digital information protection scheme for preventing illegal duplications of digital information such as digital audio information, digital visual information, digital computer program information, etc.

2. Description of the Background Art

In recent years, due to the advance of the high speed digital communication techniques such as ISDN and digital information compression technique for speeches, dynamic images, still pictures, etc. (including MPEG (Moving Picture Experts Group) and JPEG (Joint Photographic coding Experts Group), it has become possible to deliver the writings such as music, video, pictures, books, etc. to each user terminal from an information center through a communication channel, by converting them into digital information, and compressing and encoding the digital information.

In this regard, there are known examples of a delivery service utilizing a personal computer communication, etc. for a computer software which requires smaller amount of data compared with the digital information such as video. However, this conventional software delivery service utilizing a personal computer communication, etc., does not encrypt the software to be delivered, so that there has been a problem that it provides an environment in which an illegal copying of the software is easier compared with a usual software sale system using a package such as a floppy disk.

On the other hand, there is a computer software sale system using a CD-ROM that has recently been practiced in the U.S.A., in which a CD-ROM containing an encrypted main software and a non-encrypted software for demonstration is sold and distributed at low price, and when a user is satisfied with the trial on the software for demonstration, the user orders a purchase of the main software to a service center via the telephone, etc., in response to which the decryption key is notified to the user such that the user can use the encrypted main software on the purchased CD-ROM by decrypting it using the notified decryption key.

However, this computer software sale system using a CD-ROM also has problems in that it requires a human action in acquiring the decryption key from the service center via the telephone, etc., and that a privacy of the user cannot be protected. Moreover, because of the involvement of the human action, there is a possibility for the illegal copying induced by the unlawful conduct such as the illegal disposition of the decryption key.

SUMMARY OF THE INVENTION

It is therefore an object of the present invention to provide a digital information protection scheme in which the leakage of the digital information to the third party can be protected and the illegal copying of the digital information is difficult even for a legitimate user.

According to one aspect of the present invention there is provided a method for digital information protection in a system in which a user makes an access to a digital information provided by an information center, by connecting a computer card owned by the user to an information terminal device connected with the information center, the method comprising the steps of: (a) carrying out a mutual authentication between the computer card and the information terminal device; (b) carrying out a user authentication by the computer card through the information terminal device; (c) sending an information request specifying the desired digital information of the user from the information terminal device to the information center by signing and encrypting an information identifier for identifying the desired digital information; (d) sending the work key for encrypting the desired digital information from the information center to the computer card by a cipher communication using a public key cryptosystem; (e) obtaining and registering the work key sent from the information center at the computer card, and sending a work key receipt signature from the computer card to the information center; (f) receiving a work key request message containing a random number from the information terminal device at the computer card, encrypting the work key according to the random number, and sending an encrypted work key from the computer card to the information terminal device; (g) encrypting the desired digital information specified by the information request by using the work key at the information center, and sending the encrypted digital information from the information center to the information terminal device; (h) receiving and decrypting the encrypted work key sent from the computer card so as to obtain the work key at the information terminal device, receiving and decrypting the encrypted digital information sent from the information center by using the work key, and providing the decrypted digital information to the user at the information terminal device; and (i) sending an encrypted information receipt signature from the information terminal device to the information center, and recording the information request, the work key receipt signature, and the encrypted information receipt signature as a ground for charging at the information center.

According to another aspect of the present invention there is provided a method for digital information protection in a system in which a user makes an access to a digital information provided by an information center, by connecting a computer card owned by the user to an information terminal device connected with the information center, the method comprising the steps of: (a) carrying out a mutual authentication between the computer card and the information terminal device; (b) carrying out a user authentication by the computer card through the information terminal device; (c) sending an information request specifying the desired digital information of the user from the information terminal device to the information center by signing and encrypting an information identifier for identifying the desired digital information; (d) encrypting the desired digital information specified by the information request by using the work key at the information center, and sending the encrypted digital information from the information center to the information terminal device and the computer card; (e) receiving and storing the encrypted digital information sent from the information center at the information terminal device, and sending an information receipt signature from the computer card to the information center via the information terminal device; (f) delivering the work key for encrypting the desired digital information from the information center to the computer card, and obtaining and registering the work key sent from the information center at the computer card, while returning a delivery certificate from the computer card to the information center; (g) receiving a work key request message containing a random number from the information terminal device at the computer card, encrypting the work key according to the random number, and sending an encrypted work key from the computer card to the information terminal device; (h) receiving and decrypting the encrypted work key sent from the computer card so as to obtain the work key at the information terminal device, decrypting the encrypted digital information stored in the information terminal device by using the work key, and providing the decrypted digital information to the user at the information terminal device; and (i) sending an encrypted information receipt signature from the information terminal device to the information center, and recording the information request, the encrypted information receipt signature, and the delivery certificate as a ground for charging at the information center.

According to another aspect of the present invention there is provided a method for digital information protection in a system in which a user makes an access to a digital information provided by an information center, by connecting a computer card owned by the user to an information terminal device connected with the information center, the method comprising the steps of: delivering a work key for encrypting a desired digital information from the information center to the computer card through the information terminal device, and registering the work key in the computer card; delivering the desired digital information encrypted by the work key from the information center to the information terminal device; and decrypting an encrypted digital information delivered from the information center at the information terminal device by using the work key registered in the computer card, and providing a decrypted digital information to the user at the information terminal device.

According to another aspect of the present invention there is provided a digital information protection system, comprising: an information center for providing a digital information; an information terminal device connected with the information center; and a computer card owned by a user, such that the user makes an access to the digital information provided by the information center by connecting the computer card to the information terminal device; wherein the information center, the information terminal device, and the computer card are adapted to: deliver a work key for encrypting a desired digital information from the information center to the computer card through the information terminal device, and register the work key in the computer card; deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device.

According to another aspect of the present invention there is provided an information center for a digital information protection system in which a user makes an access to a digital information provided by the information center by connecting a computer card owned by the user to an information terminal device connected with the information center, wherein the information center, the information terminal device, and the computer card are adapted to: deliver a work key for encrypting a desired digital information from the information center to the computer card through the information terminal device, and register the work key in the computer card; deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device; the information center comprising: information storage means for storing the digital information; communication control means for making a communication with the information terminal device; key generation means for generating the work key; encryption means for encrypting the digital information by using the work key; public key cryptosystem means for encrypting the work key in order to make a cipher communication of the work key; and signature conversion means for providing a signature of the information center.

According to another aspect of the present invention there is provided an information terminal device for a digital information protection system in which a user makes an access to a digital information provided by an information center by connecting a computer card owned by the user to the information terminal device connected with the information center, wherein the information center, the information terminal device, and the computer card are adapted to: deliver a work key for encrypting a desired digital information from the information center to the computer card through the information terminal device, and register the work key in the computer card; deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device; the information terminal device comprising: first communication control means for making a communication with the information center; second communication control means for making a communication with the computer card; information storage means for storing the digital information; public cryptosystem means for encrypting the work key in order to make a cipher communication of the work key; signature conversion means for providing a signature of the information terminal device; random number generation means for generating a random number; matching means for matching the random number generated by the random number generation means with a random number received from the computer card; secret key storage means for storing a secret key of the information terminal device; decryption means for decrypting an encrypted work key and an encrypted digital information; and secrecy protection means for physically protecting a secrecy of the random number generation means, the matching means, the secret key storage means, and the decryption means.

According to another aspect of the present invention there is provided a computer card for a digital information protection system in which a user makes an access to a digital information provided by an information center by connecting the computer card owned by the user to an information terminal device connected with the information center, wherein the information center, the information terminal device, and the computer card are adapted to: deliver a work key for encrypting a desired digital information from the information center to the computer card through the information terminal device, and register the work key in the computer card; deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device; the computer card comprising: communication control means for making a communication with the information terminal device; public cryptosystem means for encrypting the work key in order to make a cipher communication of the work key; signature conversion means for providing a signature of the computer card; and work key storage means for storing the work key.

Other features and advantages of the present invention will become apparent from the following description taken in conjunction with the accompanying drawings.

BRIEF DESCRIPTION OF THE DRAWINGS

FIG. 16 is a diagrammatic illustration showing a procedure for an information utilization in the digital information protection of FIG. 1 according to the second embodiment when an information to be utilized is not stored in the information terminal device.

DETAILED DESCRIPTION OF THE PREFERRED EMBODIMENTS

Referring now to FIG. 1 to FIG. 11, the first embodiment of the digital information protection system according to the present invention will be described in detail.

Figure 1:
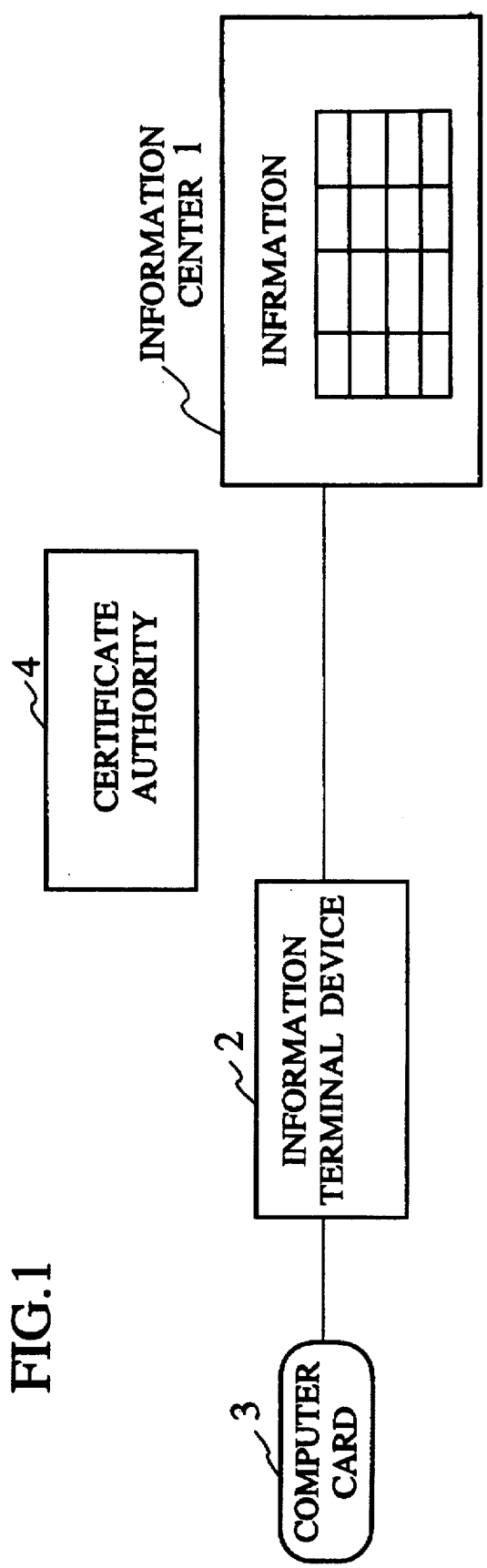
FIG. 1 is a schematic block diagram of an overall configuration for the first and second embodiments of a digital information protection system according to the present invention.

In this first embodiment, the digital information protection system has an overall configuration as shown in FIG. 1, which comprises an information center 1, an information terminal device 2 connected with the information center 1, and a computer card 3 to be connected to the information terminal device 2. In addition, there is also provided a certificate authority 4 which will be necessary only in a preliminary stage at a time of utilizing the public key cryptosystem as will be described below.

The information center 1 stores a large number of digital information supplied from information providers, and manages them in a manner of a database.

The information terminal device 2 is equipped with an image display device, a speech output device, etc. necessary in utilizing the digital information, and provided at a home of each user. The information center 1 and the information terminal device 2 are connected through a communication network such that they can communicate with each other through the communication network.

The computer card 3 is to be detachably connected to the information terminal device 2, and capable of internally storing data indicating a trade content regarding which information has been purchased. This computer card 3 is owned by each user, and each user can utilizes the purchased digital information (such as video, music, etc.) by sending it from the information center 1 to the information terminal device 2 by connecting this computer card 3 to the information terminal device 2.

Figure 2:
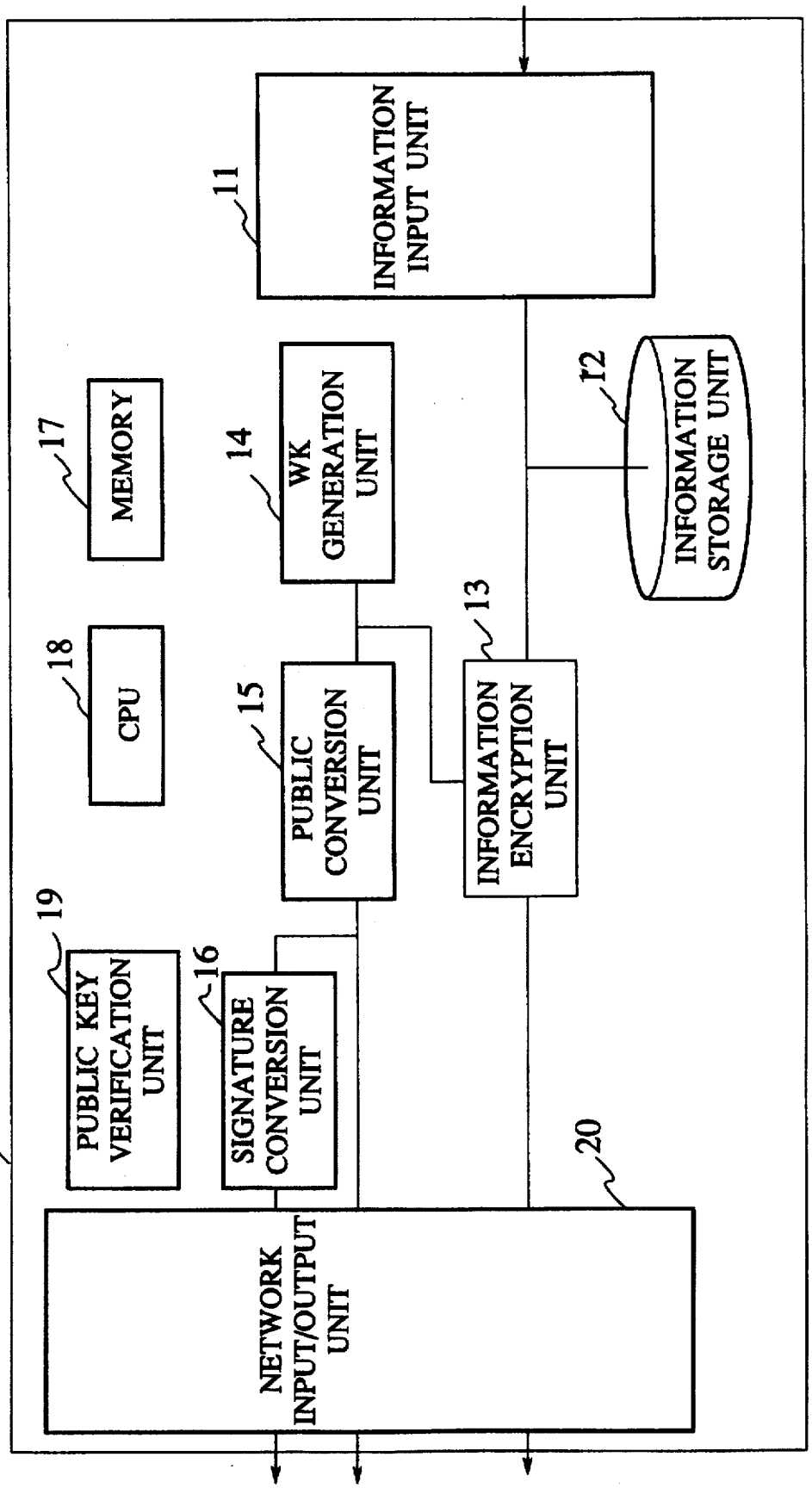
FIG. 2 is a block diagram of an internal configuration of an information center in the digital information protection of FIG. 1.

The information center 1 has an internal configuration as shown in FIG. 2, which includes: an information input unit 11 for entering an information to be utilized; an information storage unit 12 for storing the information to be utilized; an information encryption unit 13 for encrypting the information to be utilized; a WK generation unit 14 for generating a work key WK to be used at a time of encrypting the information to be utilized; a public conversion unit 15 for encrypting the work key WK; a signature conversion unit 16 for converting a signature to indicate that the encrypted work key WK belongs to the information center 1; a memory 17 for storing a public key of the information center 1, a certificate of the public key issued by the certificate authority 4, intermediate results of computations, etc.; a CPU 18 for controlling the information center 1 as a whole and executing the hash algorithm; a public key verification unit 19 for verifying the public key of the computer card 3, etc.; and a network input/output unit 20 for carrying out exchanges with the network.

Figure 3:
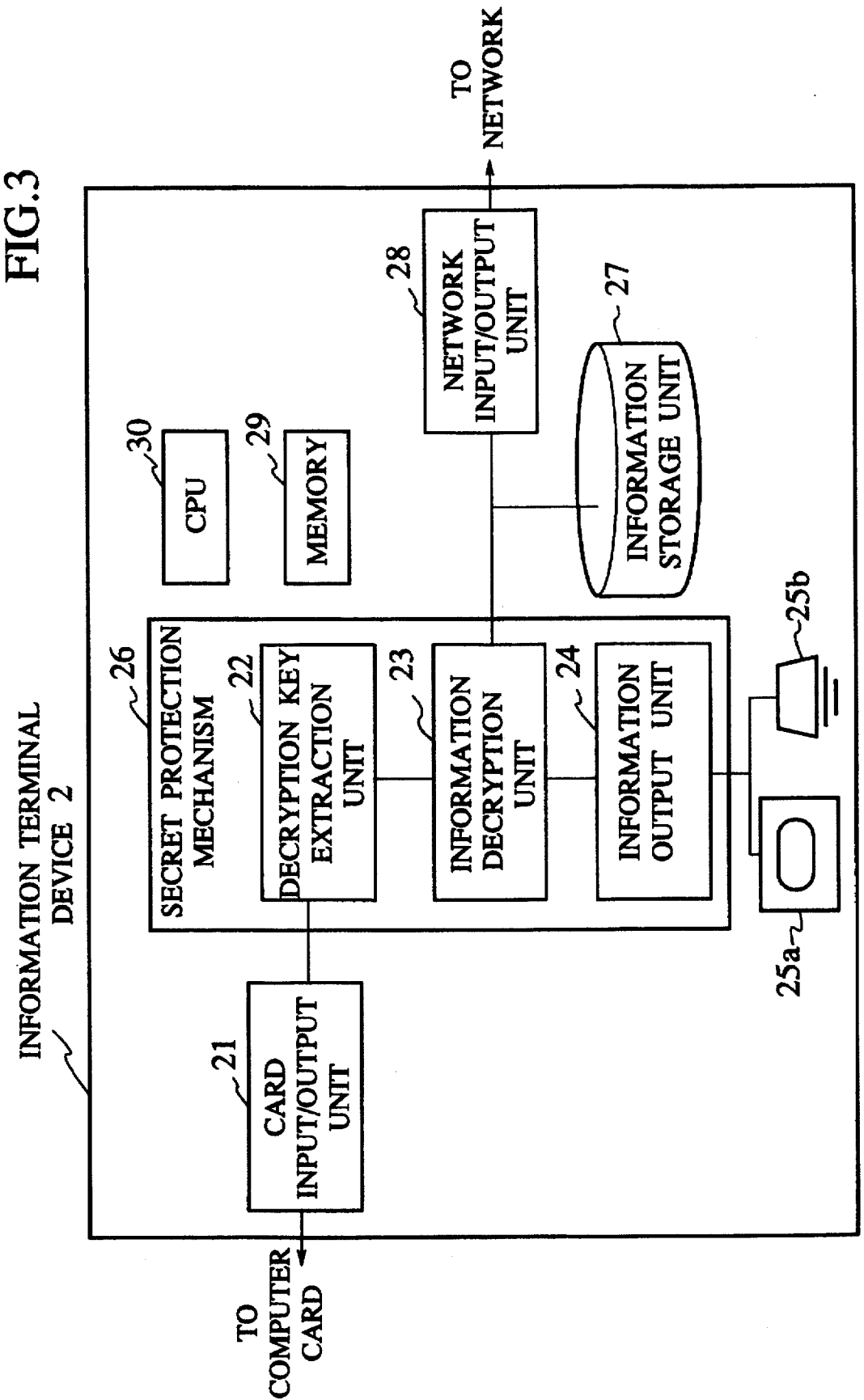
FIG. 3 is a block diagram of an internal configuration of an information terminal device in the digital information protection of FIG. 1.

The information terminal device has an internal configuration as shown in FIG. 3, which includes: a card input/output unit 21 for carrying out exchanges with the computer card 3; a decryption key extraction unit 22 for carrying out the decryption of the public key cryptosystem; an information decryption unit 23 for carrying out the decryption of the information to be utilized; an information output unit 24 for outputting the decrypted information; an image display device 25a; a speech output device 25b; a secret protection mechanism 26 for physically protecting the secrecy of the decryption key extraction unit 22, the information decryption unit 23, and the information output unit 24; an information storage unit 27 for storing the information to be utilized in an encrypted state; a network input/output unit 28 for carrying out exchanges with the network; a memory 29 for storing a public key of the information terminal device 2, the certificate of the public key issued by the certificate authority 4, intermediate results of computations, etc.; a CPU 30 for controlling the information terminal device 2 as a whole and executing the random number generation and the hash algorithm.

Figure 4:
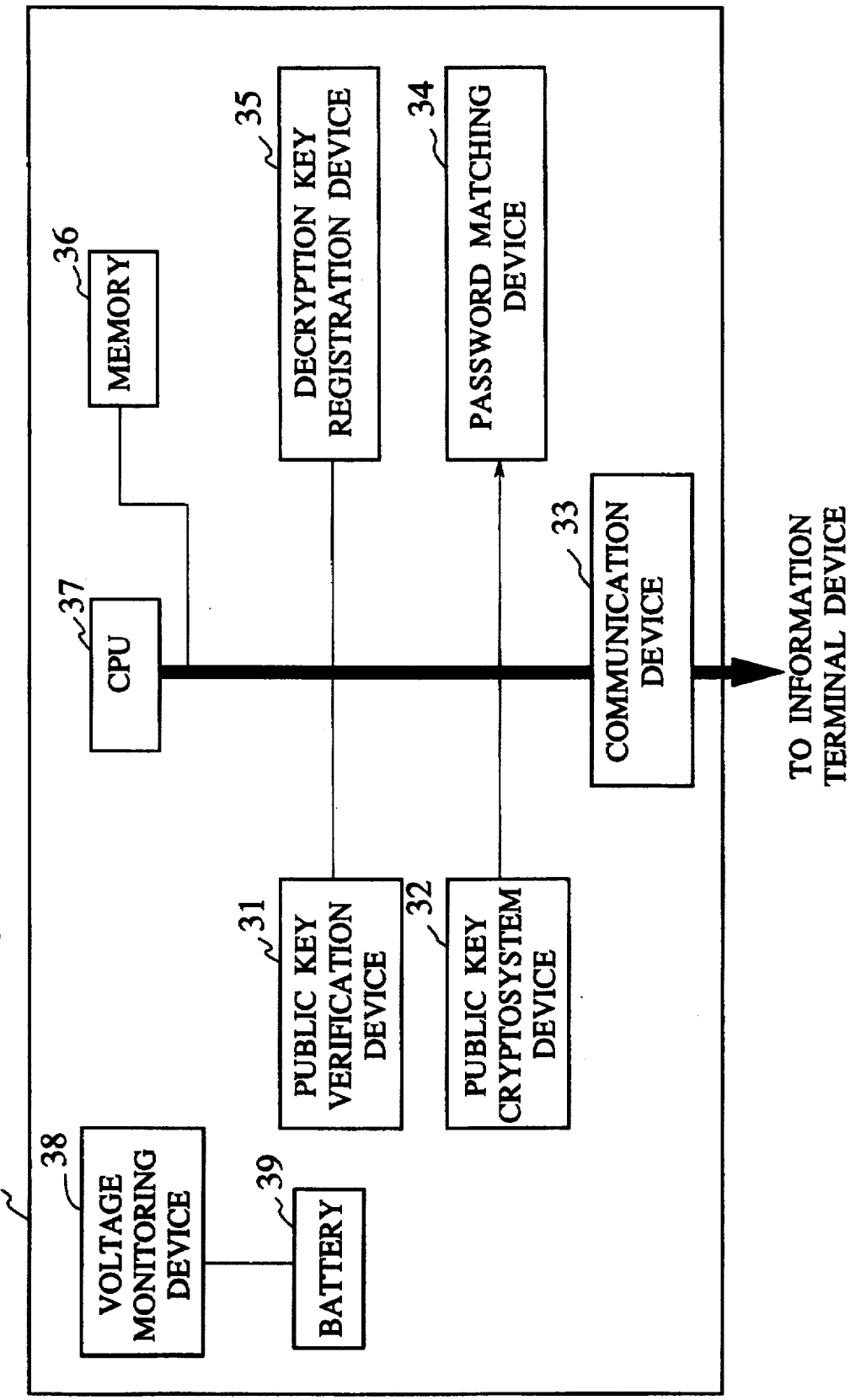
FIG. 4 is a block diagram of an internal configuration of a computer card in the digital information protection of FIG. 1.

The computer card 3 has an internal configuration as shown in FIG. 4, which includes: a public key verification device 31 for verifying the public key as a proper one according to the certificate issued by the certificate authority 4; a public key cryptosystem device 32 for applying the encryption and the signature conversion; a communication device 33 for making a communication with the information terminal device 2; a password matching device 34 for carrying out the password matching for the user authentication; a decryption key registration device 35 for registering the decryption key of the purchased information; a memory 36 for storing a public key of the computer card 3, the certificate of the public key issued by the certificate authority 4, intermediate results of computations, etc.; a CPU 37 for controlling the computer card 3 as a whole and executing the random number generation, etc.; a voltage monitoring device 38 for monitoring a voltage necessary in maintaining data such as the secret key, etc.; and a battery 39 as a back-up power source.

This digital information protection system of the first embodiment is operated according to the following information utilization protocol based on the digital information protection scheme of the present invention.

<Preparatory set up>

In the following, a conversion for encrypting a message M by a key K to obtain an encrypted message C will be denoted as C=EK(M), and a conversion for decrypting the encrypted message C to obtain the original message M will be denoted as M=DK(C). In particular, in a case of utilizing the public key cryptosystem, the encryption will be denoted as $C=EK_P$(M) and the decryption will be denoted as $M=DK_S$(C). The latter can also be used as the signature conversion as well.

The computer card 3 registers in advance its identifier $ID_U$, its public key $K_{PU}$, a certificate $X_{PU}$ of the public key $K_{PU}$, a public key $K_{PC}$ of the certificate authority 4, and its secret key $K_{SU}$, where the secret key $K_{SU}$ in particular is registered into a write only region within the public key cryptosystem device 32 which is a protected area that cannot be read out freely. The certificate $X_{PU}$ is obtained as $X_{PU}=DK_{SC}(K_{PU})$ when the public key $K_{PU}$ is authenticated by the certificate authority 4, where the $K_{SC}$ is a secret key of the certificate authority 4 which is kept in secret at the certificate authority 4.

Similarly, the information terminal device 2 registers in advance its identifier $ID_S$, its public key $K_{PS}$, a certificate $X_{PS}$ of the public key $K_{PS}$, a public key $K_{PC}$ of the certificate authority 4, and its secret key $K_{SS}$, while the information center 1 registers in advance its identifier $ID_M$, its public key $K_{PM}$, a certificate $X_{PM}$ of the public key $K_{PM}$, a public key $K_{PC}$ of the certificate authority center 4, and its secret key $K_{SM}$. Also, the computer card 3 registers data (such as a password) for authenticating the user in a state that cannot be read out illegally, by encrypting it for example.

<Mutual authentication between the computer card 3 and the information terminal device 2>

First, the mutual authentication between the computer card 3 and the information terminal device 2 is carried out according to the procedure shown in FIG. 5 as follows.

When the computer card 3 is connected to the information terminal device 3 by being inserted therein, the random number R, the public key $K_{PS}$ of the information terminal device 2 and its certificate $X_{PS}$, and the identifier $ID_S$ of the information terminal device 2 are sent from the information terminal device 2 to the computer card 3.

Then, the computer card 3 judges whether the public key $K_{PS}$ of the information terminal device 2 is a proper one or not by certifying that the public key $K_{PS}$ of the information terminal device 2 and its certificate $X_{PS}$ are consistent, by utilizing the public key $K_{PC}$ of the certificate authority 4 registered therein. When it is judged as a proper one, the signature encryption conversion is applied to the random number R sent from the information terminal device 2, and $T=EK_{PS}(DK_{SU}(R))$ or $DK_{SU}(EK_{PS}(R))$, the public key $K_{PU}$ of the computer card 3 and its certificate $X_{PU}$, and the identifier $ID_U$ of the computer card 3 are sent from the computer card 3 to the information terminal device 2.

The information terminal device 2 certifies that the public key $K_{PU}$ of the computer card 3 is a proper one by utilizing the public key $K_{PC}$ of the certificate authority 4 registered therein, and then Judges whether the connected computer card 3 is correctly that of the identifier $ID_U$ or not by certifying whether T sent from the computer card 3 is consistent with R sent to the computer card 3.

Here, when this certification fails (i.e., a result is NG), the information terminal device 2 indicates an error and ejects the computer card 3.

<User authentication>

Next, the user authentication is carried out according to the procedure shown in FIG. 6 as follows.

The user enters a password Pswd into the information terminal device 2, and the information terminal device 2 sends the entered password Pswd to the computer card 3 to judge whether the entered password Pswd is a correct one coinciding with the password registered in the computer card 3 in advance. When the entered password Pswd is a correct one, it is judged that the user is a proper user, and a menu data is displayed to the user.

In this procedure, the password input errors are allowed for a prescribed number of times, such as three times, and when the password input was tried three times unsuccessfully, the error processing to indicate an error and eject the computer card 3 is carried out as there is a possibility for this user to be an improper user. In addition, when this error processing caused by three unsuccessful trials is repeated for a prescribed number of times, such as five times, this user is judged as an improper user and the computer card 3 is invalidated.

Here, it is also possible to use different user authentication schemes. For example, it is possible to use a scheme in which the predetermined password is encrypted and stored in the computer card 3, and whether an encrypted result of the character string entered at the information terminal device 2 coincides with the stored encrypted password or not is checked, or whether the character string entered at the information terminal device 2 coincides with a decryption result of the stored encrypted password or not is checked.

It is also possible to use a scheme in which the predetermined password is stored in the computer card 3 either in an encrypted state or in a non-encrypted state, the character string entered at the information terminal device 2 is communicated from the information terminal device 2 to the computer card 3 by means of the cipher communication, whether the communicated character string coincides with the stored one or not is checked at the computer card 3, a parity of a random number generated according to whether the communicated character string coincides with the stored one or not is adjusted in the known manner, and this random number is communicated from the computer card 3 to the information terminal device 2 by means of the cipher communication.

It is also possible to use a scheme in which the predetermined password is stored in the computer card 3 either in an encrypted state or in a non-encrypted state, a sum or an exclusive OR of the character string entered at the information terminal device 2 and a random number generated at the information terminal device 2 is calculated, this calculation result is communication from the information terminal device 2 to the computer card 3 by means of the cipher communication, a difference or an exclusive OR of the communicated calculation result and the password registered in advance is calculated at the computer card 3 and an obtained value is returned from the computer card 3 to the information terminal device 2, and whether the returned value coincides with the generated random number or not is checked at the information terminal device 2.

<User's selection>

Next, the user's selection is carried out according to the procedure shown in FIG. 7 as follows.

Namely, the user selects the desired information from the menu data displayed by the information terminal device 2.

<Information request>

Next, the information request is carried out according to the procedure shown in FIG. 8 as follows.

The information terminal device 2 sends a set RKX including the information identifier Req for the information selected by the user (which can be given by an internationally valid code such as an international recording code ISRC for the music information, or an identification number assigned by the information provider that can uniquely identify the information, etc.), and the public key $K_{PM}$ of the information center 1 and its certificate $X_{PM}$, to the computer card 3.

Then, the computer card 3 certifies that the public key $K_{PM}$ of the information center 1 and its certificate $X_{PM}$ are consistent by using the public key $K_{PC}$ of the certificate authority 4 registered therein, signs Req, and obtains RQS= $DK_{SU}$(Req). Then, the computer card 3 encrypts this RQS by the public key $K_{PM}$ of the information center 1 to obtain $R_U$=$EK_{PM}$(RQS), and sends this $R_U$ to the information terminal device 2.

When $R_U$ is received, the information terminal device 2 sends this $R_U$ alone with the public key $K_{PU}$ of the computer card 3 and its certificate $X_{PU}$ to the information center 1.

Then, the information center 1 certifies that the public key $K_{PU}$ of the computer card 3 and its certificate $X_{PU}$ that are sent from the information terminal device 2 are consistent, and obtains RQS=$DK_{SM}$($R_U$). Then, the information center 1 obtains Req=$EK_{PU}$(RQS), and retrieves the information specified by the obtained Req.

<Key delivery and key receipt signing>

Figure 9:
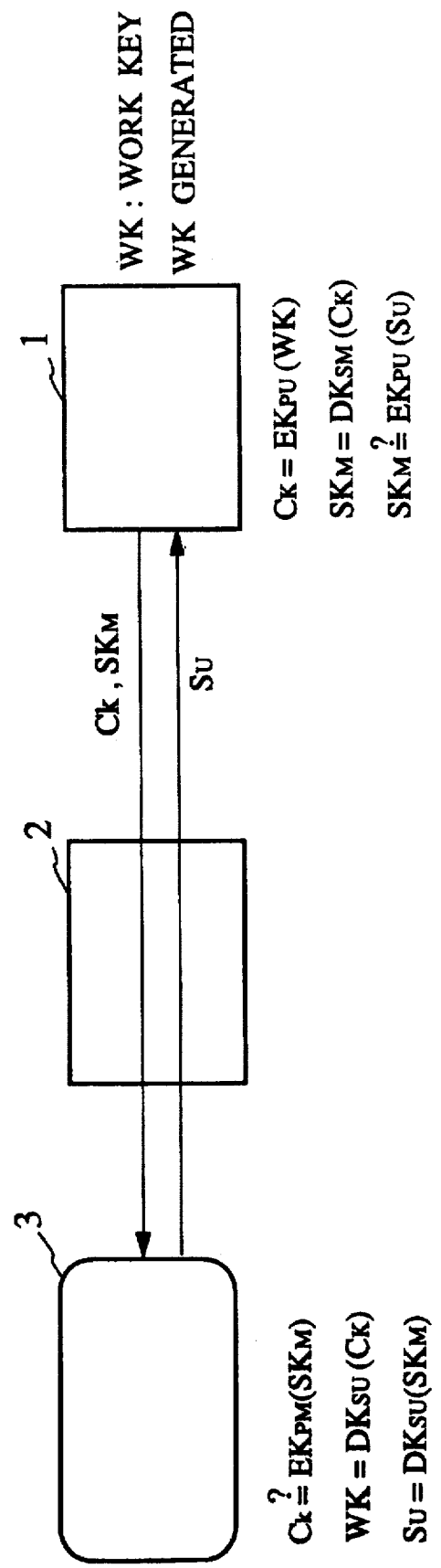
FIG. 9 is a diagrammatic illustration showing a procedure for a key delivery and a key receipt signing in the digital information protection of FIG. 1 according to the first embodiment.

Next, the key delivery and the key receipt signing are carried out according to the procedure shown in FIG. 9 as follows.

The information center 1 generates the work key WK for encrypting the information to be utilized, encrypts this work key WK by the public key $K_{PU}$ of the computer card 3, signs $C_K$=$EK_{PU}$(WK), and sends this $C_K$ along with $SK_M$=$DK_{SM}$($C_K$) to the computer card 3 via the information terminal device 2.

Then, the computer card 3 verifies whether the signature is correct or not, obtains the work key WK by decrypting $C_K$, and sends $S_U$=$DK_{SU}$($SK_M$) to the information center 1 via the information terminal device 2 as a receipt signature for the work key WK. Meanwhile, the obtained work key WK is stored in the computer card 3 along with the information identifier Req in a state that cannot be read out illegally, by encrypting it for example.

<Work key WK request>

Figure 10:
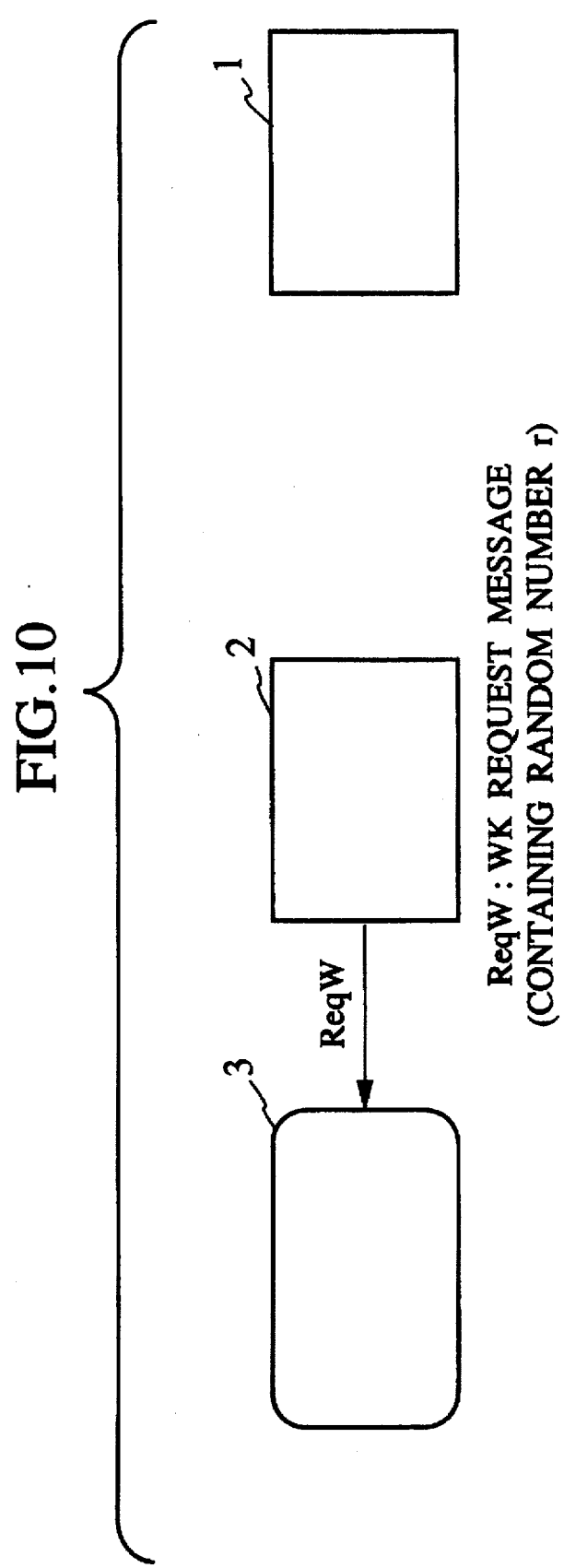
FIG. 10 is a diagrammatic illustration showing a procedure for a work key WK request in the digital information protection of FIG. 1 according to the first embodiment.

Next, the work key WK request is carried out according to the procedure shown in FIG. 10 as follows.

Namely, after the information terminal device 2 sent $S_U$ to the information center 1, the information terminal device 2 sends a WK request message ReqW containing a random number r to the computer card 3.

<Information delivery and information utilization>

Figure 11:
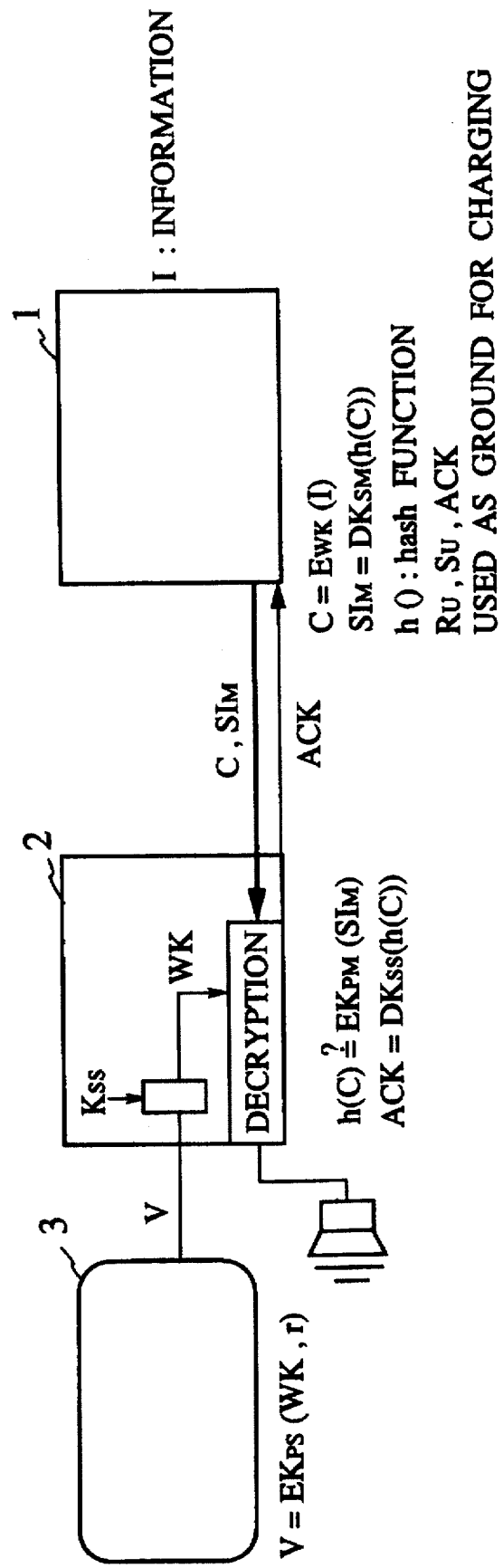
FIG. 11 is a diagrammatic illustration showing a procedure for an information delivery and an information utilization in the digital information protection of FIG. 1 according to the first embodiment.

Next, the information delivery and the information utilization are carried out according to the procedure shown in FIG. 11 as follows.

The computer card 3 concatenates the random number r contained in the WK request message ReqW and the work key WK, encrypts them by the public key $K_{PS}$ of the information terminal device 2, and sends the resulting V=$EK_{PS}$(WK, r) to the information terminal device 2.

Then, at the information terminal device 2, after V is decrypted by using the secret key $K_{SS}$ of the information terminal device 2, whether the random number r coincides with that contained in the WK request message ReqW or not is checked, and the work key WK is set.

On the other hand, when the work key receipt signature $S_U$ is received, the information center 1 divides the information I into processing units, encrypts each processing unit of this information I by the work key WK, applies a hash function h() to C=EWK(I), signs this h(C), and sends C and $SI_M$=$DK_{SM}$(h(C)) to the information terminal device 2. Then, the information terminal device 2 verifies that this signature is correct, and decrypts the encrypted information C.

Here, the secrecy is physically maintained from a device for decrypting by using the secret key $K_{SS}$ to a device for decrypting by using the work key WK. To this end, this section, i.e., the secret protection mechanism 26 of the information terminal device 2 shown in FIG. 3, can be set in a safe box and sealed, or it is possible to adopt a scheme disclosed in R. Mori and M. Kawahara: "Superdistribution: The concept and the Architecture", Trans. IEICE, Vol. E73, No. 7, pp. 1133–1146, July 1990.

When C is decrypted, a signature of the information terminal device 2 is attached to it, and ACK=$DK_{SS}$(h(C)) is returned to the information center 1. Then, the information center 1 certifies that ACK is a proper one, and records $R_U$, $S_U$, and ACK as a ground for charging. The information center 1 then continues the processing for the next processing unit after the return of ACK is confirmed.

As described, according to this first embodiment, the encrypted information itself and the decryption key are separated while the decryption key is safely stored within the computer card 3. As a result, the information will not be leaked to the third party because the information is delivered in an encrypted state, and the illegal copying will be difficult because the decryption key is confined within the computer card 3 and it is difficult even for the legitimate user to learn the decryption key while the decryption of the information and the decryption of the work key WK are carried out at devices which are physically sealed within the information terminal device 2.

Consequently, it is possible to construct a system that can be utilized by the information provider without any anxiety. In addition, there is no disadvantage from the user's standpoint, and the desired information can be utilized by making an access to the information center even when it is not available at the information terminal device located nearby, so that there is an advantage that the information becomes available from any information terminal device.

Referring now to FIG. 12 to FIG. 16, the second embodiment of the digital information protection system according to the present invention will be described in detail.

In this second embodiment, the digital information protection system has an overall configuration similar to that of the first embodiment shown in FIG. 1. In this second embodiment, the information center 1 has an internal configuration similar to that shown in FIG. 2 described above except that the CPU 18 also executes an information conversion for the delivery certification. Also, the information terminal device 2 has an internal configuration substantially similar to that shown in FIG. 3 described above. Also, the computer card 3 has an internal configuration similar to that shown in FIG. 4 described above except that the CPU 37 also executes an information conversion for the delivery certification.

This digital information protection system of the second embodiment is operated according to the following information utilization protocol based on the digital information protection scheme of the present invention.

<Preparatory set up>

In this second embodiment, the computer card 3 registers in advance its identifier $ID_U$, its public key $K_{PU}$, a certificate $X_{PU}$ of the public key $K_{PU}$, a public key $K_{PC}$ of the certificate authority 4, its secret key $K_{SU}$, a secret information S, and a public information n', where the secret key $K_{SU}$ and the secret information S in particular are registered into a write only region within the public key cryptosystem device 32 which is a protected area that cannot be read out freely. Here, $ID_U$, S, and n' have a relationship of $ID_U = S^2$ mod n', and n' is a product of two large prime numbers which has a size of several hundred bits.

The rest of the preparatory set up is substantially similar to that of the first embodiment described above.

<Mutual authentication between the computer card 3 and the information terminal device 2>

Figure 5:
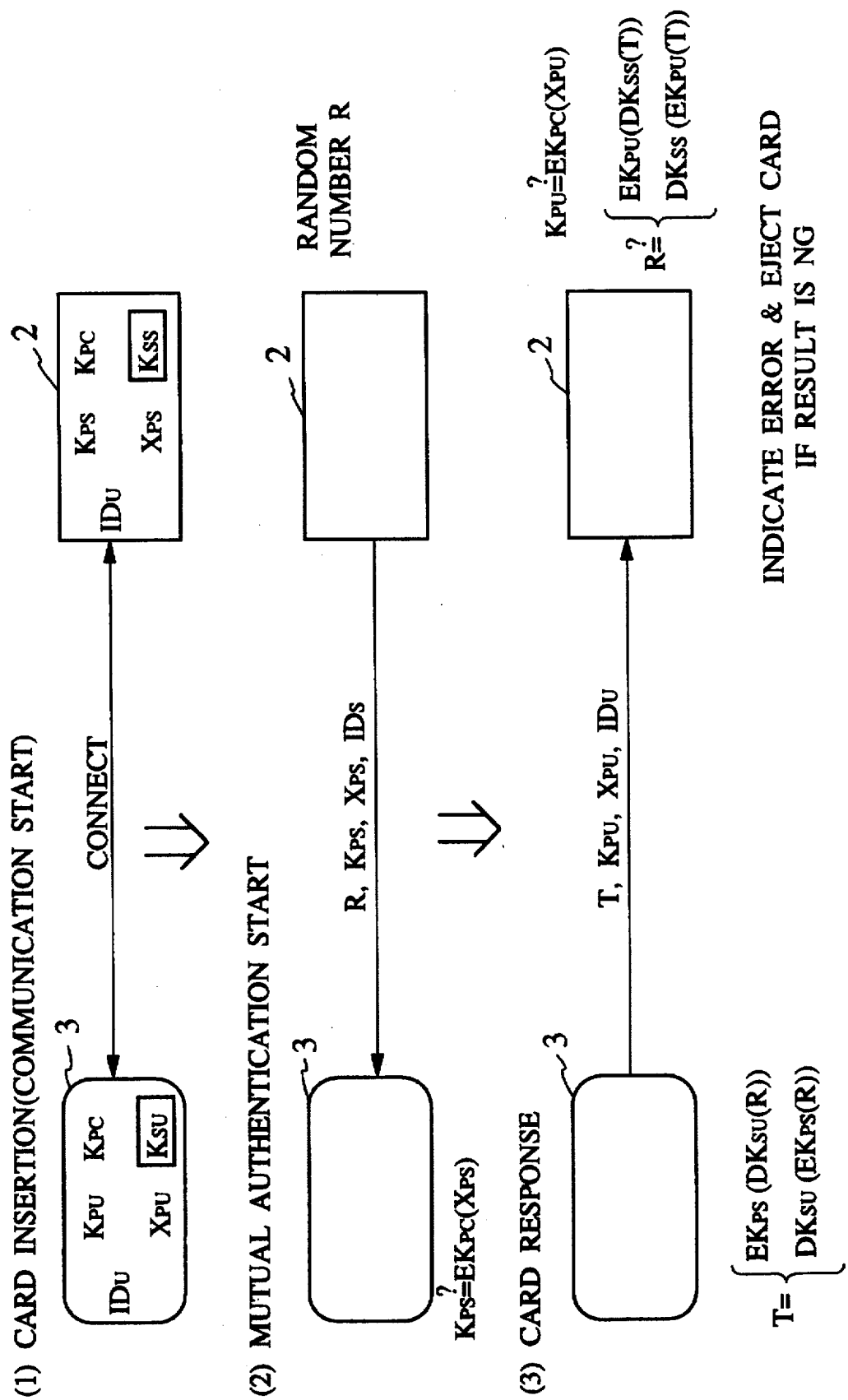
FIG. 5 is a diagrammatic illustration showing a procedure for a mutual authentication between the information terminal device and the computer card in the digital information protection of FIG. 1.

First, the mutual authentication between the computer card 3 and the information terminal device 2 is carried out substantially as the procedure shown in FIG. 5 described above.

<User authentication>

Figure 6:
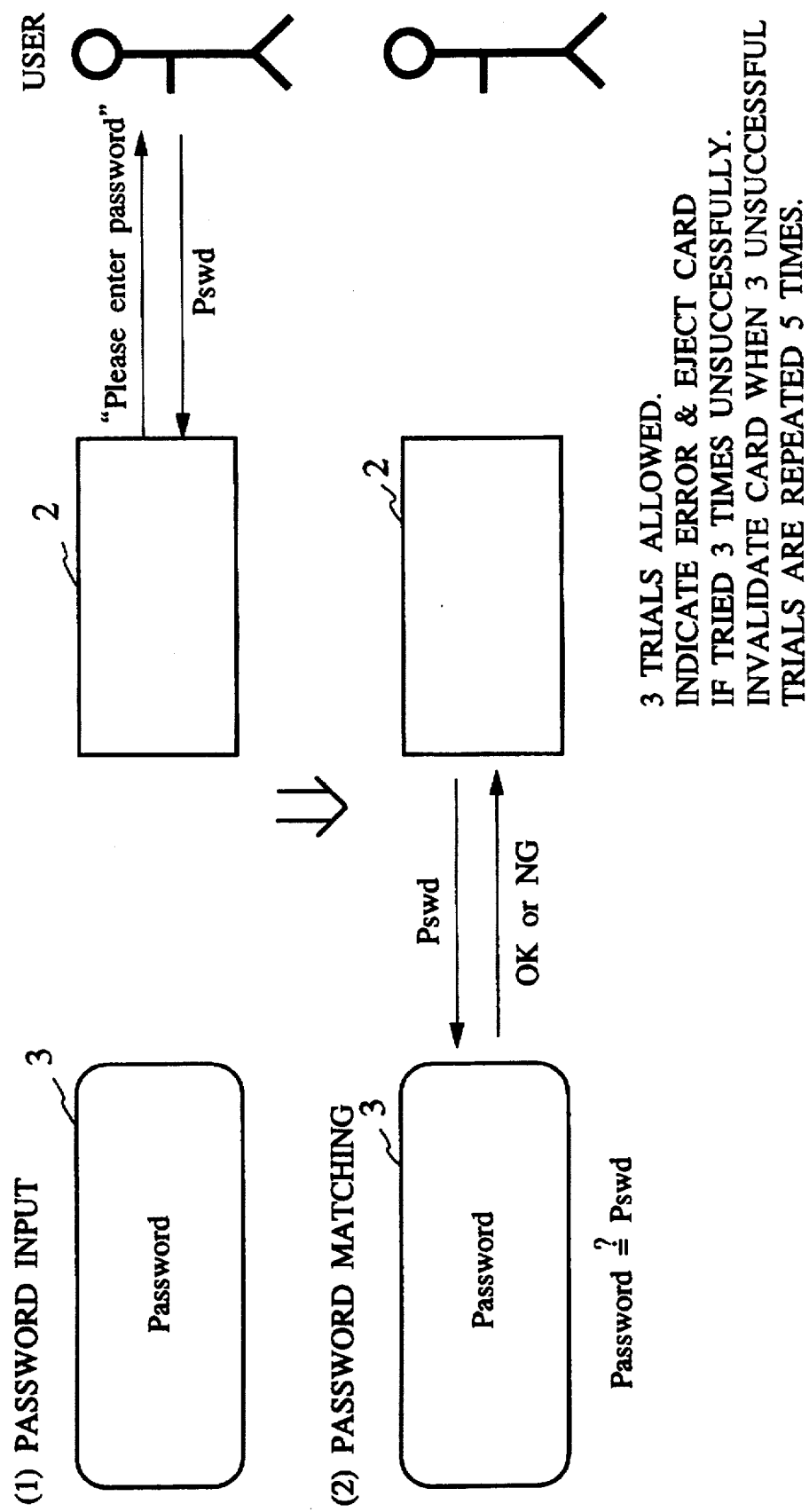
FIG. 6 is a diagrammatic illustration showing a procedure for a user authentication in the digital information protection of FIG. 1.

Next, the user authentication is carried out substantially as the procedure shown in FIG. 6 described above.

<User's selection>

Figure 7:
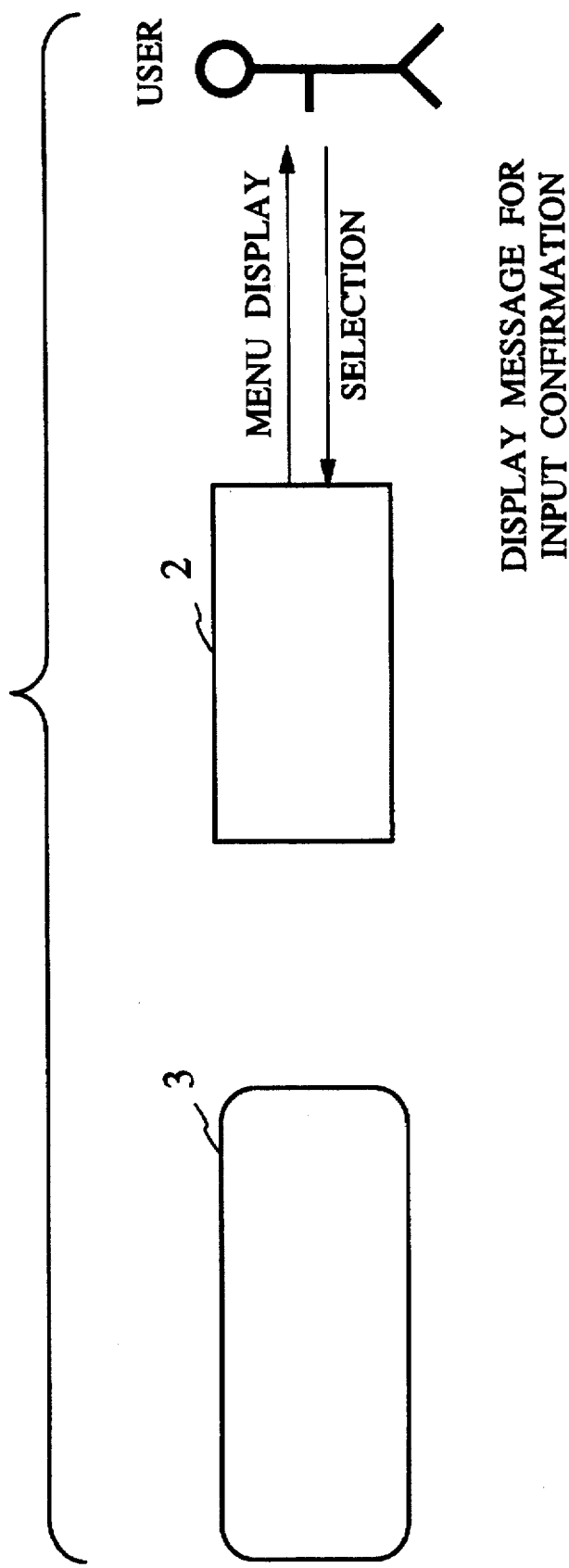
FIG. 7 is a diagrammatic illustration showing a procedure for a user's selection in the digital information protection of FIG. 1.

Next, the user's selection is carried out substantially as the procedure shown in FIG. 7 described above.

<Information request>

Figure 8:
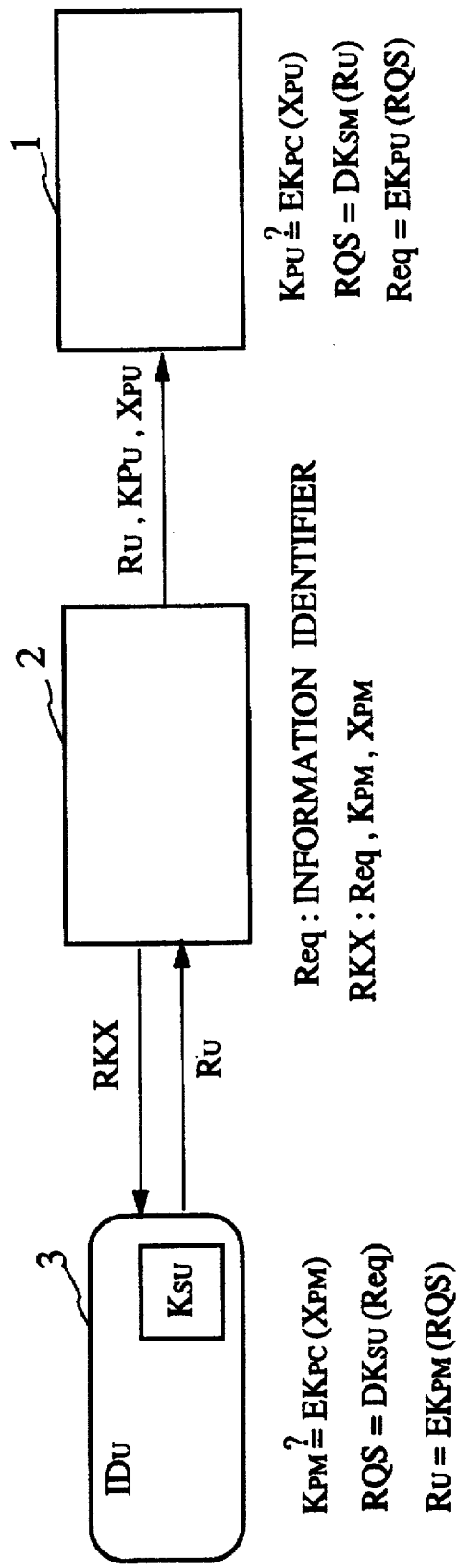
FIG. 8 is a diagrammatic illustration showing a procedure for an information request in the digital information protection of FIG. 1.

Next, the information request is carried out substantially as the procedure shown in FIG. 8 described above.

<Information delivery and storage, and information center authentication>

Figure 12:
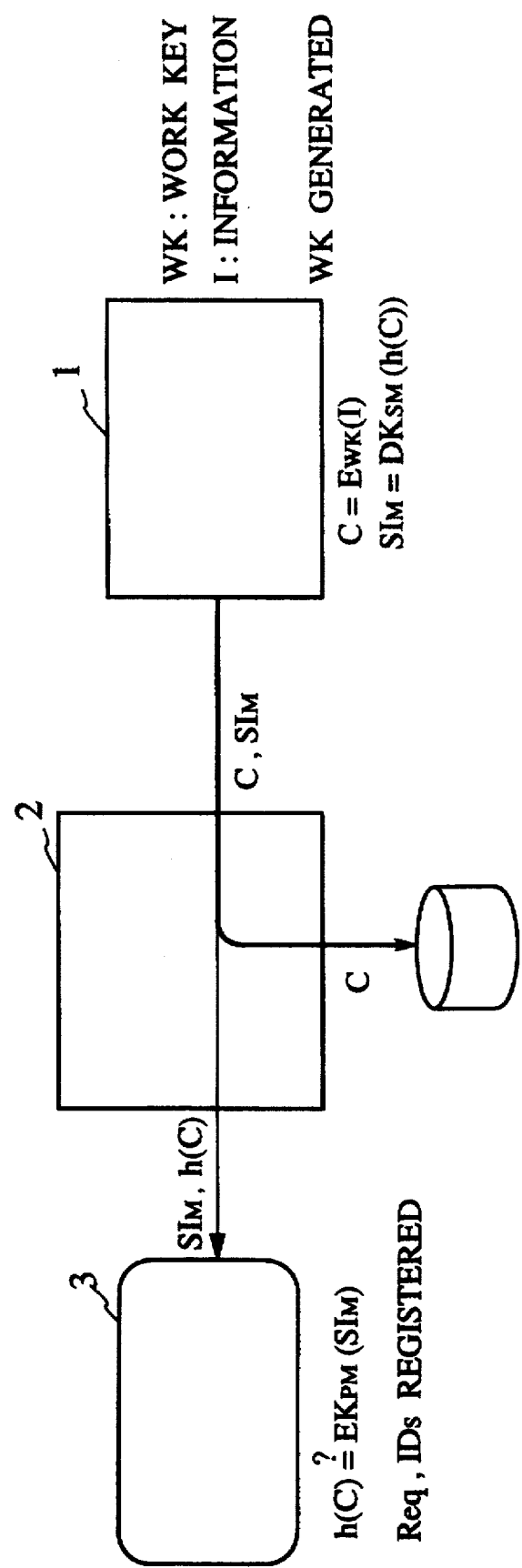
FIG. 12 is a diagrammatic illustration showing a procedure for an information delivery and storage and an information center authentication in the digital information protection of FIG. 1 according to the second embodiment.

Next, the information delivery and storage and the information center authentication are carried out according to the procedure shown in FIG. 12 as follows.

The information center 1 generates the work key WK for encrypting the information I to be utilized and encrypts this information I to obtain C=EWK(I), and stores this encrypted information C in the information storage unit 12. Also, in order to indicate that this encrypted information C is surely what is sent out from the information center 1, a signature of the information center 1 is attached to this encrypted information C. Here, the attaching of the signature to the entire encrypted information is inefficient, so that the signature is attached with respect to h(C) in which the amount of C is reduced by the one-way random hash algorithm h in a manner of $SI_M = DK_{SM}(h(C))$. Then, the information center 1 sends C and $SI_M$ obtained in this manner to the information terminal device 2.

The information terminal device 2 then applies the hash algorithm h to the encrypted information C received from the information center 1 to obtain h(C), and sends this h(C) along with the $SI_M$ received from the information center 1 to the computer card 3.

The computer card 3 then verifies whether this signature is correct or not by checking whether $EK_{PM}(SI_M)$ coincides with h(C) by using the public key $K_{PM}$ of the information center 1, and registers the information identifier Req, and the encrypted identifier $ID_S$ of the information terminal device 2.

<Signing and delivery certification preparation>

Figure 13:
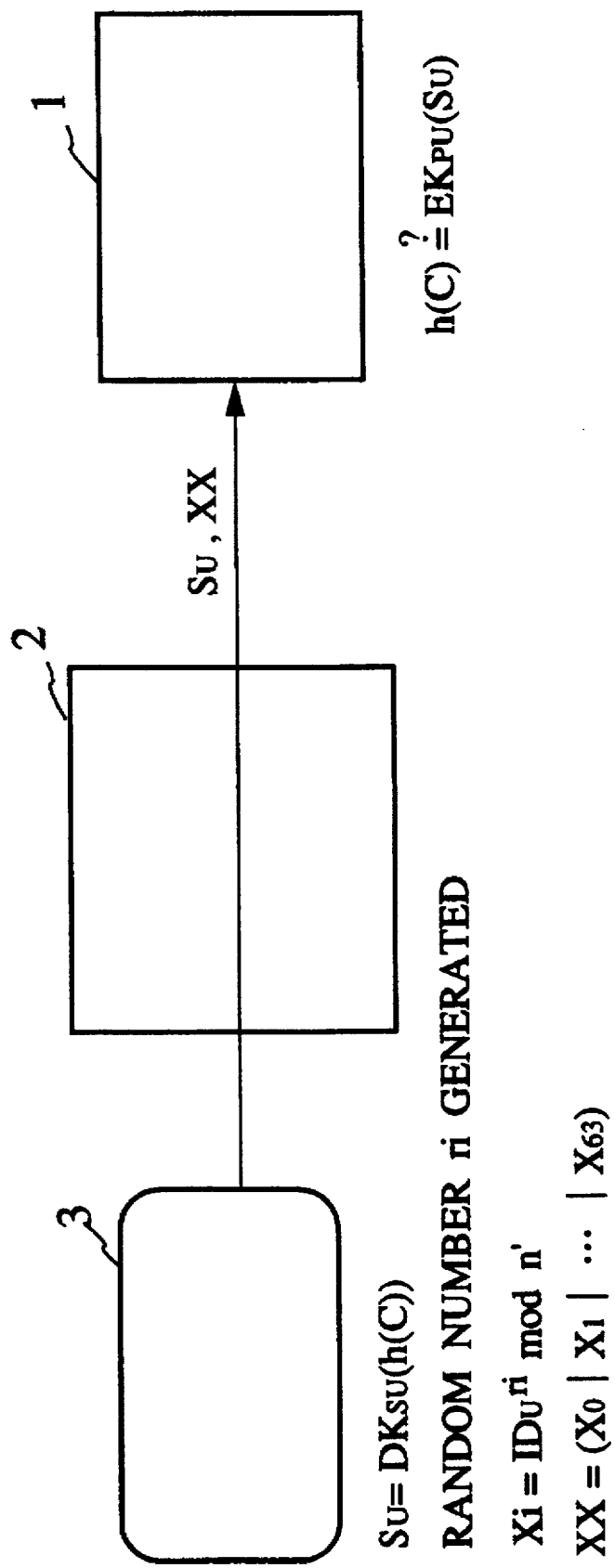
FIG. 13 is a diagrammatic illustration showing a procedure for a signing and a delivery certification preparation in the digital information protection of FIG. 1 according to the second embodiment.

Next, the signing and the delivery certification preparation are carried out according to the procedure shown in FIG. 13 as follows.

The computer card 3 signs the hashed and encrypted information h(C) by using the secret key $K_{SU}$ of the computer card 3 in order to notify the information center 1 that the encrypted information C has been stored in the information terminal device 2 in a manner of $S_U = DK_{SU}(h(C))$, and sends this $S_U$ to the information center 1 via the information terminal device 2.

The information center 1 then verifies whether this signature $S_U$ is correct or not by checking whether $EK_{PU}(S_U)$ coincides with h(C).

Next, for the purpose of the delivery certification, the computer card 3 generates a random number $r_i$ (i=0, 1, . . . , t−1) and obtains $X_i = ID_U^{r_i}$ mod n', and sends XX=($X_0|X_1|$ . . . $|X_{t-1}$) to the information center 1 via the information terminal device 2, where t is a number of bits in the work key WK, and a symbol | denotes a concatenation.

<Key delivery and delivery certification>

Figure 14:
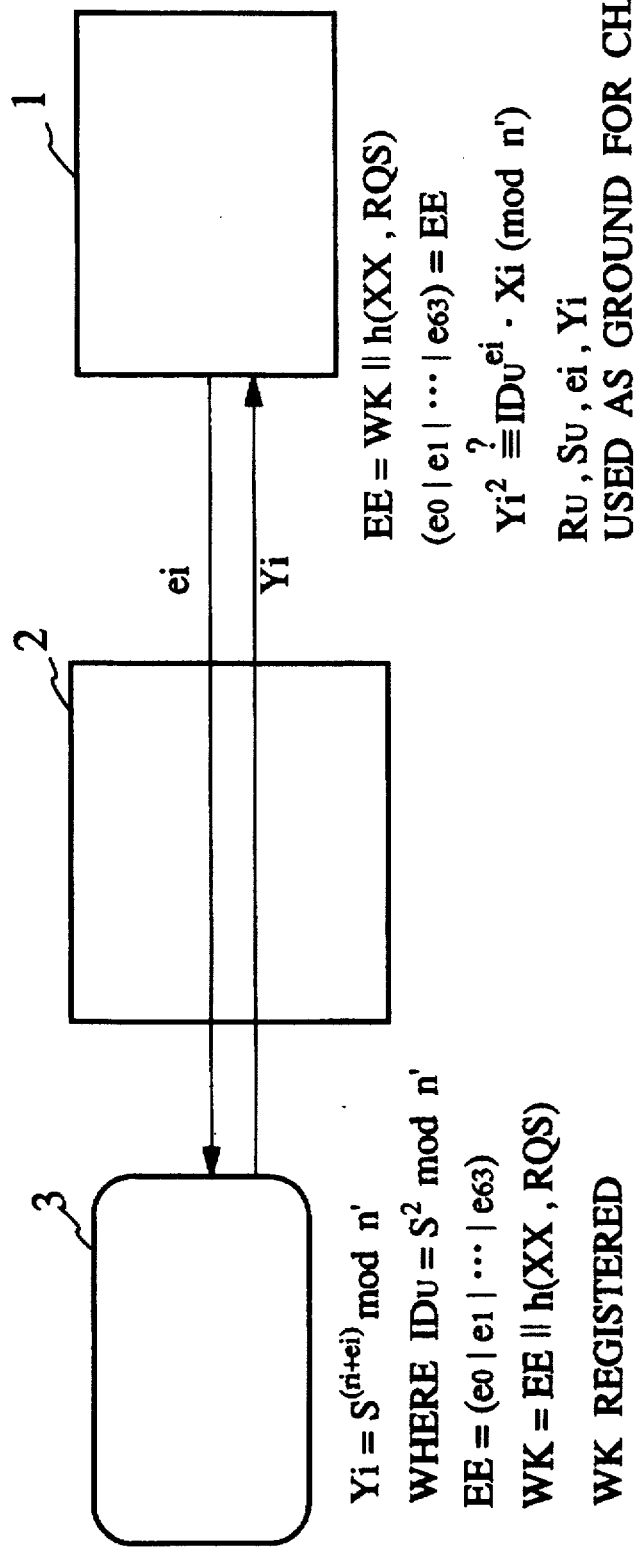
FIG. 14 is a diagrammatic illustration showing a procedure for a key delivery and a delivery certification in the digital information protection of FIG. 1 according to the second embodiment.

Next, the key delivery and the delivery certification are carried out according to the procedure shown in FIG. 14 as follows.

The information center 1 obtains EE=WK||h(XX, RQS) from XX, RQS, and WK, where a symbol || denotes an exclusive OR for each bit, and then divides this EE bit by bit and sets each bit as $e_i$ (i=0, 1, . . . , t−1).

Then, the information center 1 sends $e_0$ to the computer card 3 first. In response, the computer card 3 calculates $Y_0 = S^{(r_0 + e_0)}$ mod n' from the received $e_0$, and returns this $Y_0$ to the information center 1. Here, S is defined such that $ID_U = S^2$ mod n' holds.

When $Y_0$ is received from the computer card 3, the information center 1 verifies whether $Y_0^2 \equiv ID_U^{e_0} X_0 \pmod{n'}$ holds or not. When this relationship holds, the information center 1 sends $e_1$ to the computer card 3 next, and carries out the verification for $Y_1$ in the similar manner. This operation is repeated for t times, until $Y_{t-1}$ is verified. After $Y_{t-1}$ is verified, the information center 1 records $R_U$, $S_U$, $e_i$, and $Y_i$ (i=0, 1, . . . , t−1) as the ground for charging.

On the other hand, the computer card 3 obtains EE by concatenating the received $e_i$ as EE=($e_0 e_1$|. . . |$e_{t-1}$), obtains WK from this EE as WK=EE||h(XX, RQS), and registers this WK in correspondence to Req and $ID_S$ It is to be noted that in the above procedure, a manner of sending $e_i$ bit by bit has been described as a simple manner of sending $e_i$, but it is also possible to send some number of bits together instead.

<Information utilization>

Figure 15:
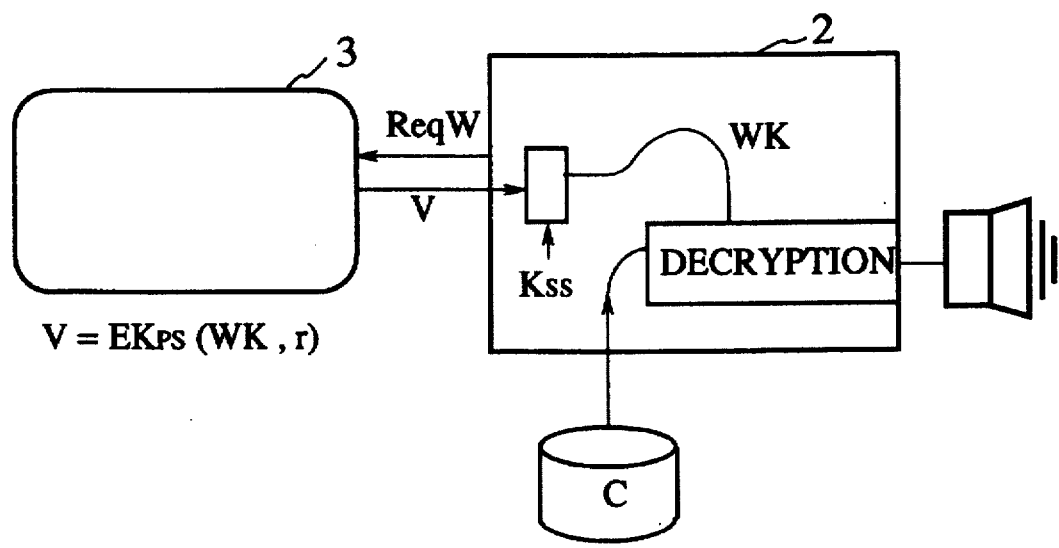
FIG. 15 is a diagrammatic illustration showing a procedure for an information utilization in the digital information protection of FIG. 1 according to the second embodiment when an information to be utilized is stored in the information terminal device.

Next, in a case the information to be utilized is stored in the information terminal device 2, the information utilization is carried out according to the procedure shown in FIG. 15 as follows.

When the user utilizes the information, the computer card 3 is connected to the information terminal device 2 and this information terminal device 2 is operated. At this point, the WK request message ReqW containing a random number r is sent from the information terminal device 2 to the computer card 3. Then, the computer card 3 concatenates the random number r contained in the WK request message ReqW and the work key WK, encrypts them by the public key $K_{PS}$ of the information terminal device 2, and sends the resulting V=$EK_{PS}$(WK, r) to the information terminal device 2.

Then, at the information terminal device 2, after V is decrypted by using the secret key $K_{SS}$ of the information terminal device 2, whether the random number r coincides with that contained in the WK request message ReqW or not is checked, and the work key WK is set. Then, the information terminal device 2 decrypts the encrypted information C stored therein by using this work key WK to put the information in a utilizable state.

Here, the secrecy is physically maintained from a device for decrypting by using the secret key $K_{SS}$ to a device for decrypting by using the work key WK. To this end, this section, i.e., the secret protection mechanism 26 of the information terminal device 2 shown in FIG. 3, can be set in a safe box and sealed, or it is possible to adopt a scheme disclosed in R. Mori and M. Kawahara: "Superdistribution: The concept and the Architecture", Trans. IEICE, Vol. E73, No. 7, pp. 1133–1148, July 1990.

In this manner, the legitimate user can utilize the information stored in the information terminal device 2 whenever necessary, as long as the user has the proper computer card 3.

<Information utilization in a case the information to be utilized in not in the information terminal device 2>

Next, in a case the information to be utilized is not stored in the information terminal device 2, the information utilization is carried out according to the procedure shown in FIG. 16 as follows.

After the information request is made according to the procedure of FIG. 8 described above, the computer card 3 checks whether that information identifier Req is registered therein or not. If this information identifier Req is registered, the information terminal device identifier $ID_S'$ corresponding to this information identifier Req is sent to the currently connected information terminal device 2 with the identifier $ID_S$. In response, this information terminal device 2 with the identifier $ID_S$ sends the information identifier Req to another information terminal device 2' with the identifier $ID_S'$ to have the encrypted information C transferred from this another information terminal device 2'. Thereafter, the information utilization according to the procedure shown in FIG. 15 described above is carried out with respect to this encrypted information C.

Alternatively, it is also possible to use the following procedure for utilizing the information while the information is transferred. Namely, after $S_U$ is sent out to the information center 1, the information terminal device 2 sends the WK request message ReqW containing a random number r to the computer card 3. Then, the computer card 3 concatenates the random number r contained in the WK request message ReqW and the work key WK, encrypts them by the public key $K_{PS}$ of the information terminal device 2, and sends the resulting V=$EK_{PS}$(WK, r) to the information terminal device 2.

Then, at the information terminal device 2, after V is decrypted by using the secret key $K_{SS}$ of the information terminal device 2, whether the random number r coincides with that contained in the WK request message ReqW or not is checked, and the work key WK is set. Then, the information terminal device 2 decrypts the encrypted information C by using this work key WK to put the information in a utilizable state, and returns ACK to the computer card 3 in order to indicate that the work key WK has been received. At this point, it is also possible for the information terminal device 2 to store the information while the information is decrypted.

As described, according to this second embodiment, in addition to the advantages that the information will not be leaked to the third party and the illegal copying will be difficult as in the first embodiment described above, it also becomes possible to surely and accurately charge the information by means of the delivery certification data.

Consequently, it is also possible to construct a system that can be utilized by the information provider without any anxiety. In addition, there is no disadvantage from the user's standpoint, and the desired information can be utilized by making an access to the information center even when it is not available at the information terminal device located nearby, so that there is an advantage that the information becomes available from any information terminal device.

It is to be noted that the first and second embodiments described above have been directed to a case of utilizing the public communication channel such as ISDN, but the present invention is equally applicable to a case of using the connection-less channel such as a dedicated line.

It is also to be noted that the applicability of the present invention is not limited to the computer software, and extends to all kinds of a digital information delivery utilizing the communication of the encrypted digital information.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for digital information protection in a system in which a user makes an access to a digital information provided by an information center, by connecting a computer card owned by the user to an information terminal device connected with the information center, the method comprising the steps of:

(a) carrying out a mutual authentication between the computer card and the information terminal device;

(b) carrying out a user authentication by the computer card through the information terminal device;

(c) sending an information request specifying the desired digital information of the user from the information terminal device to the information center by signing and encrypting an information identifier for identifying the desired digital information;

(d) sending the work key for encrypting the desired digital information from the information center to the computer card by a cipher communication using a public key cryptosystem;

(e) obtaining and registering the work key sent from the information center at the computer card, and sending a work key receipt signature from the computer card to the information center;

(f) receiving a work key request message containing a random number from the information terminal device at the computer card, encrypting the work key according to the random number, and sending an encrypted work key from the computer card to the information terminal device;

(g) encrypting the desired digital information specified by the information request by using the work key at the information center, and sending the encrypted digital information from the information center to the information terminal device;

(h) receiving and decrypting the encrypted work key sent from the computer card so as to obtain the work key at the information terminal device, receiving and decrypting the encrypted digital information sent from the information center by using the work key, and providing the decrypted digital information to the user at the information terminal device; and (i) sending an encrypted information receipt signature from the information terminal device to the information center, and recording the information request, the work key receipt signature, and the encrypted information receipt signature as a ground for charging at the information center.

2. The method of claim 1, wherein at the step (a), the mutual authentication between the computer card and the information terminal device is realized by sending a random number generated by the information terminal device to the computer card, signing and encrypting the random number at the computer card and returning a signed and encrypted random number to the information terminal device, and checking whether the signed and encrypted random number is consistent with the random number at the information terminal device.

3. The method of claim 1, wherein at the step (b), the user authentication by the computer card is realized by storing a prescribed password in the computer card, checking whether a user input entered at the information terminal device coincides with the prescribed password at the computer card, executing an error processing when an erroneous user input is repeated for a prescribed number of times, and invalidating the computer card when the error processing is repeated for a predetermined number of times.

4. The method of claim 1, wherein at the step (b), the user authentication by the computer card is realized by storing a prescribed password in an encrypted state in the computer card, and checking whether a user input entered at the information terminal device coincides with the prescribed password in a decrypted state at the computer card, or checking whether a user input entered and encrypted at the information terminal device coincides with the prescribed password in the encrypted state at the computer card.

5. The method of claim 1, wherein at the step (b), the user authentication by the computer card is realized by storing a prescribed password in the computer card, sending a user input entered at the information terminal device to the computer card by a cipher communication, checking whether the user input coincides with the prescribed password at the computer card, adjusting a parity of a random number generated according to whether the user input coincides with the prescribed password at the computer card, and sending the random number to the information terminal device by a cipher communication.

6. The method of claim 1, wherein at the step (b), the user authentication by the computer card is realized by storing a prescribed password in the computer card, sending a first value indicating a sum or an exclusive OR of a user input entered at the information terminal device and a random number generated at the information terminal device to the computer card by a cipher communication, sending a second value indicating a difference or an exclusive OR of of the first value and the prescribed password at the computer card to the information terminal device, and checking whether the second value coincides with the random number at the information terminal device.

7. The method of claim 1, wherein at the step (c), the information terminal device sends the information identifier, a public key of the information center, and a certificate for the public key of the information center to the computer card, the computer card signs and encrypts the information identifier by using a secret key of the computer card and the public key of the information center and returns a signed and encrypted information identifier to the information terminal device, and the information terminal device sends the signed and encrypted information identifier along with a public key of the computer card and a certificate for the public key of the computer card to the information center, so as to prevent an improper access to the information center.

8. The method of claim 1, wherein at the steps (d) and (e), the information center generates the work key, encrypts the work key by a public key of the computer card, and sends a generated and encrypted work key along with a signature of the information center to the computer card via the information terminal device, and the computer card verifies whether the signature of the information center is correct or not, obtains the work key from the generated and encrypted work key, sends the work key receipt signature to the information center via the information terminal device, and registers the work key along with the information identifier.

9. The method of claim 1, wherein at the step (f), the information terminal device sends the work key request message containing the random number to the computer card, after the work key receipt signature is sent from the computer card to the information center via the information terminal device.

10. The method of claim 1, wherein at the step (f), the computer card concatenates and encrypts the work key and the random number by using a public key of the information terminal device, and sends concatenated and encrypted work key and random number to the information terminal device, and at the step (h), the information terminal device decrypts the concatenated and encrypted work key and random number, checks whether a decrypted random number coincides with the random number contained in the work key request message, and decrypts the encrypted digital information sent from the information center by using a decrypted work key.

11. A method for digital information protection in a system in which a user makes an access to a digital information provided by an information center, by connecting a computer card owned by the user to an information terminal device connected with the information center, the method comprising the steps of:

(a) carrying out a mutual authentication between the computer card and the information terminal device;

(b) carrying out a user authentication by the computer card through the information terminal device;

(c) sending an information request specifying the desired digital information of the user from the information terminal device to the information center by signing and encrypting an information identifier for identifying the desired digital information;

(d) encrypting the desired digital information specified by the information request by using the work key at the information center, and sending the encrypted digital information from the information center to the information terminal device and the computer card;

(e) receiving and storing the encrypted digital information sent from the information center at the information terminal device, and sending an information receipt signature from the computer card to the information center via the information terminal device;

(f) delivering the work key for encrypting the desired digital information from the information center to the computer card, and obtaining and registering the work key sent from the information center at the computer card, while returning a delivery certificate from the computer card to the information center;

(g) receiving a work key request message containing a random number from the information terminal device at the computer card, encrypting the work key according to the random number, and sending an encrypted work key from the computer card to the information terminal device;

(h) receiving and decrypting the encrypted work key sent from the computer card so as to obtain the work key at the information terminal device, decrypting the encrypted digital information stored in the information terminal device by using the work key, and providing the decrypted digital information to the user at the information terminal device; and (i) sending an encrypted information receipt signature from the information terminal device to the information center, and recording the information request, the encrypted information receipt signature, and the delivery certificate as a ground for charging at the information center.

12. The method of claim 11, wherein at the step (a), the mutual authentication between the computer card and the information terminal device is realized by sending a random number generated by the information terminal device to the computer card, signing and encrypting the random number at the computer card and returning a signed and encrypted random number to the information terminal device, and checking whether the signed and encrypted random number is consistent with the random number at the information terminal device.

13. The method of claim 11, wherein at the step (b), the user authentication by the computer card is realized by storing a prescribed password in the computer card, checking whether a user input entered at the information terminal device coincides with the prescribed password at the computer card, executing an error processing when an erroneous user input is repeated for a prescribed number of times, and invalidating the computer card when the error processing is repeated for a predetermined number of times.

14. The method of claim 11, wherein at the step (b), the user authentication by the computer card is realized by storing a prescribed password in an encrypted state in the computer card, and checking whether a user input entered at the information terminal device coincides with the prescribed password in a decrypted state at the computer card, or checking whether a user input entered and encrypted at the information terminal device coincides with the prescribed password in the encrypted state at the computer card.

15. The method of claim 11, wherein at the step (b), the user authentication by the computer card is realized by storing a prescribed password in the computer card, sending a user input entered at the information terminal device to the computer card by a cipher communication, checking whether the user input coincides with the prescribed password at the computer card, adjusting a parity of a random number generated according to whether the user input coincides with the prescribed password at the computer card, and sending the random number to the information terminal device by a cipher communication.

16. The method of claim 11, wherein at the step (b), the user authentication by the computer card is realized by storing a prescribed password in the computer card, sending a first value indicating a sum or an exclusive OR of a user input entered at the information terminal device and a random number generated at the information terminal device to the computer card by a cipher communication, sending a second value indicating a difference or an exclusive OR of of the first value and the prescribed password at the computer card to the information terminal device, and checking whether the second value coincides with the random number at the information terminal device.

17. The method of claim 11, wherein at the step (c), the information terminal device sends the information identifier, a public key of the information center, and a certificate for the public key of the information center to the computer card, the computer card signs and encrypts the information identifier by using a secret key of the computer card and the public key of the information center and returns a signed and encrypted information identifier to the information terminal device, and the information terminal device sends the signed and encrypted information identifier alone with a public key of the computer card and a certificate for the public key of the computer card to the information center, so as to prevent an improper access to the information center.

18. The method of claim 11, wherein at the step (c), the information terminal device sends the information identifier, a public key of the information center, and a certificate for the public key of the information center to the computer card, the computer card signs the information identifier and encrypts a signed information identifier by using a secret key of the computer card and the public key of the information center and returns a signed and encrypted information identifier to the information terminal device, the information terminal device sends the signed and encrypted information identifier along with a public key of the computer card and a certificate for the public key of the computer card to the information center, and the information center decrypts the signed and encrypted information identifier to obtain the signed information identifier and utilizes the signed information identifier in delivering the work key and obtaining the delivery certificate at the step (f).

19. The method of claim 11, wherein at the steps (d) and (e), the information center generates the work key, encrypts the desired digital information by the work key, and sends the encrypted digital information along with a signature in which the encrypted digital information is compressed and signed to the information terminal device, the information terminal device stores the encrypted digital information while the computer card verifies whether the signature is correct or not, and registers the information identifier along with an identifier for the information terminal device.

20. The method of claim 11, wherein at the step (e), the computer card signs a compressed and encrypted digital information to obtain the encrypted information receipt signature, and sends the encrypted information receipt signature to the information center, and the information center verifies the encrypted information receipt signature to confirm that the encrypted digital information has been correctly stored in the information terminal device and the information identifier for the encrypted digital information has been registered in the computer card.

21. The method of claim 11, wherein at the step (f), the delivery certificate certifies that the work key has been correctly delivered from the information center to the computer card.

22. The method of claim 11, wherein at the step (g), the computer card concatenates and encrypts the work key and the random number by using a public key of the information terminal device, and sends concatenated and encrypted work key and random number to the information terminal device, and at the step (h), the information terminal device decrypts the concatenated and encrypted work key and random number, checks whether a decrypted random number coincides with the random number contained in the work key request message, and decrypts the encrypted digital information stored in the information terminal device by using a decrypted work key.

23. The method of claim 11, further comprising the step of:
transferring another encrypted digital information stored in another information terminal device to the information terminal device; and
storing said another encrypted digital information transferred at the transferring step in the information terminal device such that said another encrypted digital information can be utilized at the information terminal device by carrying out the steps (f) to (i) with respect to said another encrypted digital information.

24. The method of claim 11, further comprising the step of:
transferring another encrypted digital information stored in another information terminal device to the information terminal device; and
carrying out the steps (f) to (i) with respect to said another encrypted digital information transferred at the transferring step.

25. A method for digital information protection in a system in which a user makes an access to a digital information provided by an information center, by connecting a computer card owned by the user to an information terminal device connected with the information center, the method comprising the steps of:
delivering a work key for encrypting a desired digital information from the information center to the computer card through the information terminal device, and registering the work key in the computer card;
delivering the desired digital information encrypted by the work key from the information center to the information terminal device; and
decrypting an encrypted digital information delivered from the information center at the information terminal device by using the work key registered in the computer card, and providing a decrypted digital information to the user at the information terminal device.

26. The method of claim 25, further comprising the steps of:
sending an information request specifying the desired digital information of the user from the information terminal device to the information center;
sending a work key receipt signature from the computer card to the information center in response to a delivery of the work key;
sending an encrypted information receipt signature from the information terminal device to the information center in response to a delivery of the encrypted digital information; and
recording the information request, the work key receipt signature, and the encrypted information receipt signature as a ground for charging at the information center.

27. The method of claim 25, further comprising the steps of:
sending an information request specifying the desired digital information of the user from the information terminal device to the information center;
sending an encrypted information receipt signature from the information terminal device to the information center in response to a delivery of the encrypted digital information;
returning a delivery certificate from the computer card to the information center in a course of a delivery of the work key; and
recording the information request, the encrypted information receipt signature, and the delivery certificate as a ground for charging at the information center.

28. A digital information protection system, comprising:
an information center for providing a digital information;
an information terminal device connected with the information center; and
a computer card owned by a user, such that the user makes an access to the digital information provided by the information center by connecting the computer card to the information terminal device;
wherein the information center, the information terminal device, and the computer card are adapted to:
deliver a work key for encrypting a desired digital information from the information center to the computer card through the information terminal device, and register the work key in the computer card;
deliver the desired digital information encrypted by the work key from the information center to the information terminal device; and
decrypt an encrypted digital information delivered from the information center at the information terminal device by using the work key registered in the computer card, and provide a decrypted digital information to the user at the information terminal device.

29. The system of claim 28, wherein the information center, the information terminal device, and the computer card are further adapted to:
send an information request specifying the desired digital information of the user from the information terminal device to the information center;
send a work key receipt signature from the computer card to the information center in response to a delivery of the work key;
send an encrypted information receipt signature from the information terminal device to the information center in response to a delivery of the encrypted digital information; and record the information request, the work key receipt signature, and the encrypted information receipt signature as a ground for charging at the information center.

30. The system of claim 28, wherein the information center, the information terminal device, and the computer card are further adapted to:

send an information request specifying the desired digital information of the user from the information terminal device to the information center;

send an encrypted information receipt signature from the information terminal device to the information center in response to a delivery of the encrypted digital information;

return a delivery certificate from the computer card to the information center in a course of a delivery of the work key; and record the information request, the encrypted information receipt signature, and the delivery certificate as a ground for charging at the information center.

31. An information center for a digital information protection system in which a user makes an access to a digital information provided by the information center by connecting a computer card owned by the user to an information terminal device connected with the information center, wherein the information center, the information terminal device, and the computer card are adapted to:

deliver a work key for encrypting a desired digital information from the information center to the computer card through the information terminal device, and register the work key in the computer card;

deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device;

the information center comprising:

information storage means for storing the digital information;

communication control means for making a communication with the information terminal device;

key generation means for generating the work key;

encryption means for encrypting the digital information by using the work key;

public key cryptosystem means for encrypting the work key in order to make a cipher communication of the work key; and signature conversion means for providing a signature of the information center.

32. The information center of claim 31, further comprising information conversion means for delivering the work key to the computer card while receiving a delivery certificate from the computer card.

33. An information terminal device for a digital information protection system in which a user makes an access to a digital information provided by an information center by connecting a computer card owned by the user to the information terminal device connected with the information center, wherein the information center, the information terminal device, and the computer card are adapted to:

deliver a work key for encrypting a desired digital information from the information center to the computer card through the information terminal device, and register the work key in the computer card;

deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device;

the information terminal device comprising:

first communication control means for making a communication with the information center;

second communication control means for making a communication with the computer card;

information storage means for storing the digital information;

public cryptosystem means for encrypting the work key in order to make a cipher communication of the work key;

signature conversion means for providing a signature of the information terminal device;

random number generation means for generating a random number;

matching means for matching the random number generated by the random number generation means with a random number received from the computer card;

secret key storage means for storing a secret key of the information terminal device;

decryption means for decrypting an encrypted work key and an encrypted digital information; and secrecy protection means for physically protecting a secrecy of the random number generation means, the matching means, the secret key storage means, and the decryption means.

34. A computer card for a digital information protection system in which a user makes an access to a digital information provided by an information center by connecting the computer card owned by the user to an information terminal device connected with the information center, wherein the information center, the information terminal device, and the computer card are adapted to:

deliver a work key for encrypting a desired digital information from the information center to the computer card through the information terminal device, and register the work key in the computer card;

deliver the desired digital information encrypted by the work key from the information center to the information terminal device; and decrypt an encrypted digital information delivered from the information center at the information terminal device by using the work key registered in the computer card, and provide a decrypted digital information to the user at the information terminal device;

the computer card comprising:

communication control means for making a communication with the information terminal device;

public cryptosystem means for encrypting the work key in order to make a cipher communication of the work key;

signature conversion means for providing a signature of the computer card; and work key storage means for storing the work key.

35. The computer card of claim 34, further comprising information conversion means for receiving a delivery of the work key from the information center while returning a delivery certificate to the information center.

* * * * *